United States Patent
Hong et al.

(10) Patent No.: US 9,932,228 B2
(45) Date of Patent: Apr. 3, 2018

(54) HYBRID REFORMING SYSTEM USING CARBON DIOXIDE PLASMA AND CATALYST

(71) Applicant: KOREA BASIC SCIENCE INSTITUTE, Daejeon (KR)

(72) Inventors: Yong Cheol Hong, Goyang-Si (KR); Dae Hyun Choi, Gunsan-Si (KR); Se Min Chun, Jeju-Si (KR)

(73) Assignee: KOREA BASIC SCIENCE INSTITUTE, Yuseong-Gu (KR)

( * ) Notice: Subject to any disclaimer, the term of this patent is extended or adjusted under 35 U.S.C. 154(b) by 195 days.

(21) Appl. No.: 14/928,733

(22) Filed: Oct. 30, 2015

(65) Prior Publication Data
US 2016/0121296 A1 May 5, 2016

(30) Foreign Application Priority Data
Oct. 31, 2014 (KR) ........................ 10-2014-0149958

(51) Int. Cl.
*B01J 19/12* (2006.01)
*C01B 3/38* (2006.01)
*C01B 3/34* (2006.01)
*B01J 19/08* (2006.01)

(52) U.S. Cl.
CPC .............. *C01B 3/38* (2013.01); *B01J 19/088* (2013.01); *B01J 19/126* (2013.01); *C01B 3/342* (2013.01);
(Continued)

(58) Field of Classification Search
CPC ........... C01B 3/38; C01B 3/342; C01B 3/384; C01B 2203/0238; C01B 2203/0811; C01B 2203/0844; C01B 2203/0861; C01B 2203/1241; C01B 2203/142; C01B 2203/01; B01J 19/088; B01J 19/126;
(Continued)

(56) References Cited

U.S. PATENT DOCUMENTS 6,395,197 B1 * 5/2002 Detering ................ B01J 19/088
252/373
2008/0135457 A1 * 6/2008 Ridge ..................... C10B 49/06
208/427

(Continued)

*Primary Examiner* — Xiuyu Tai
(74) *Attorney, Agent, or Firm* — Rabin & Berdo, P.C.

(57) ABSTRACT

The present invention provides a hybrid reforming system for producing syngas through a reforming reaction between carbon dioxide plasma and a hydrocarbon material, the system comprising: a carbon dioxide feeder (110) which feeds carbon dioxide; a hydrocarbon material feeder (120) which feeds the hydrocarbon material; a plasma reformer (200) which respectively receives carbon dioxide and the hydrocarbon material from the carbon dioxide feeder (110) and the hydrocarbon material feeder (120), and produces primary syngas through a reforming reaction while producing the carbon dioxide plasma using electromagnetic waves; a wet carbon-refining device (130) which is arranged at a gas exhaust end of the plasma reformer (200) and filters and refines carbon contained in the primary syngas; and a catalyst dry-reformer (140) which is arranged at a gas exhaust end of the wet carbon-refining device (130) and produces secondary syngas by making the refined syngas undergo a catalyst dry-reforming reaction.

6 Claims, 3 Drawing Sheets

(52) U.S. Cl.
CPC ....... *C01B 3/384* (2013.01); *B01J 2219/0869* (2013.01); *B01J 2219/0871* (2013.01); *B01J 2219/0875* (2013.01); *B01J 2219/0883* (2013.01); *B01J 2219/0892* (2013.01); *B01J 2219/0894* (2013.01); *C01B 2203/0238* (2013.01); *C01B 2203/0811* (2013.01); *C01B 2203/0844* (2013.01); *C01B 2203/0861* (2013.01); *C01B 2203/1241* (2013.01); *C01B 2203/142* (2013.01)

(58) Field of Classification Search
CPC ........ B01J 2219/0871; B01J 2219/0875; B01J 2219/0883; B01J 2219/0892; B01J 2219/0894; F23G 5/027; F23G 5/085; F23G 5/30; F23G 2201/40; F23G 2203/50; F23G 2204/201; C10J 3/84; C10J 2300/1853; C10J 2300/165; C10J 2300/1637; F02B 43/10; F02C 3/22
See application file for complete search history.

(56) References Cited

U.S. PATENT DOCUMENTS

| | | | | |
|---|---|---|---|---|
| 2014/0157669 A1* | 6/2014 | Hartvigsen | ............... | C01B 3/36 48/198.5 |
| 2014/0364517 A1* | 12/2014 | Selstam | .................... | C10J 3/18 518/704 |
| 2015/0033755 A1* | 2/2015 | Taylor | .................... | F23G 5/027 60/780 |

\* cited by examiner

HYBRID REFORMING SYSTEM USING CARBON DIOXIDE PLASMA AND CATALYST

CROSS-REFERENCE TO RELATED APPLICATION

This application claims priority to and the benefit of Korean Patent Application No. 10-2014-0149958 filed in the Korean Intellectual Property Office on Oct. 31, 2014, the entire contents of which are incorporated herein by reference.

BACKGROUND OF THE INVENTION (a) Field of the Invention

The present invention relates to a hybrid reforming system using carbon dioxide plasma and a catalyst, and more particularly to a hybrid reforming system which can maximize a reforming efficiency since a supplied hydrocarbon material undergoes a dry reforming-reaction with carbon dioxide plasma to produce primary syngas and the produced primary syngas undergoes a dry reforming-reaction with a catalyst to produce secondary syngas.

(b) Description of the Related Art

In general, there has been widely used a reforming technology that employs plasma or a catalyst for a dry reforming-reaction with methane or the like hydrocarbon material and carbon dioxide in order to produce hydrogen or carbon monoxide or the like syngas, thereby recycling carbon dioxide.

However, a conventional dry-reforming method using plasma has problems that there are many limitations in reforming a large amount of carbon dioxide or methane since standards for manufacturing a plasma reformer where a plasma reforming reaction occurs are restricted, and a reforming efficiency is lower than that of a reforming method using a catalyst.

Further, a conventional dry-reforming method using a catalyst has a problem of a complicated system since it requires strict control of heat to maintain a temperature for activating the catalyst in consideration of an endothermic reaction. If heat is improperly controlled, the catalyst may have poor performance since it becomes deteriorated at high temperature and a lot of carbon is adsorbed to the catalyst.

In addition, if the catalyst is made of nonprecious metal, it is possible to keep device costs down, but there is a need of a separate reducing process. On the other hand, if the catalyst is made of precious metal, it is possible to avoid the reducing process, but there is a problem of rising device costs. Besides, if fuel contains sulfur or the like impurities, an activation area becomes narrower due to catalyst poisoning.

RELATED REFERENCE (Patent Document 1) Korean Patent No. 10-1401423 (2014, May 23), titled 'COMBUSTIBLE SYNGAS PRODUCTION APPARATUS AND METHOD FROM CARBON DIOXIDE USING MICROWAVE PLASMA-CATALYST HYBRID PROCESS.'

SUMMARY OF THE INVENTION

Accordingly, the present invention is conceived to solve the forgoing problems, and an aspect of the present invention is to provide a hybrid reforming system using carbon dioxide plasma and a catalyst, which can maximize a reforming efficiency since a supplied hydrocarbon material primarily undergoes a dry reforming-reaction with carbon dioxide plasma and secondarily undergoes a dry reforming-reaction with a catalyst, and prevent carbon deposition since primary syngas passes through a wet carbon-refining device.

In accordance with an aspect of the present invention, there is provided a hybrid reforming system for producing syngas through a reforming reaction between carbon dioxide plasma and a hydrocarbon material, the system including: a carbon dioxide feeder 110 which feeds carbon dioxide; a hydrocarbon material feeder 120 which feeds the hydrocarbon material; a plasma reformer 200 which respectively receives carbon dioxide and the hydrocarbon material from the carbon dioxide feeder 110 and the hydrocarbon material feeder 120, and produces primary syngas through a reforming reaction while producing the carbon dioxide plasma using electromagnetic waves; a wet carbon-refining device 130 which is arranged at a gas exhaust end of the plasma reformer 200 and filters and refines carbon contained in the primary syngas; and a catalyst dry-reformer 140 which is arranged at a gas exhaust end of the wet carbon-refining device 130 and produces secondary syngas by making the refined syngas undergo a catalyst dry-reforming reaction.

The plasma reformer 200 may include: an electromagnetic wave feeder 210 which generates electromagnetic waves having a preset frequency; a discharge tube 220 which produces carbon dioxide plasma P from the electromagnetic waves, carbon dioxide and the hydrocarbon material; a supporter 230 which is mounted to a circumference of the discharge tube 220 and includes a carbon dioxide inlet 231 for injecting carbon dioxide into the discharge tube 220 and a first hydrocarbon material inlet 232 for injecting the hydrocarbon material; and a nozzle 240 which includes an outer tube 241 having a tubular shape opened upward and downward, placed above the supporter 230, provided with a second hydrocarbon material inlet 242 at an upper circumference thereof to inject the hydrocarbon material to undergo a reforming reaction with the carbon dioxide plasma P, an inner tube 243 having a tubular shape opened upward and downward, and uprightly arranged inside the outer tube 241 to communicate with the discharge tube 220, and a preheating tube 244 formed in between the outer tube 241 and the inner tube 243 due to difference between an inner diameter of the outer tube 241 and an outer diameter of the inner tube 243, and having an upper end communicating with the second hydrocarbon material inlet 242 and a lower end formed with an inlet 245 communicating with an inside of the inner tube 243.

The inner tube 243 may be made of a thermally conductive material and heated by the carbon dioxide plasma P so that the hydrocarbon material passing through the preheating tube 244 can be preheated to have a predetermined temperature.

In accordance with another aspect of the present invention, there is provided a hybrid reforming system for producing syngas through a reforming reaction between carbon dioxide plasma P and a hydrocarbon material, the system including: a carbon dioxide feeder 310 which feeds carbon dioxide; a hydrocarbon material feeder 320 which feeds the hydrocarbon material; and a plasma-catalyst reformer 400 which has an integrated structure where a plasma reforming zone 410 and a catalyst reforming zone 420 are provided, respectively receives carbon dioxide and the hydrocarbon material from carbon dioxide feeder 310 and the hydrocarbon material feeder 320, produces primary syngas through a reforming reaction while producing the carbon dioxide plasma P within the plasma reforming zone 410 using electromagnetic waves, and produces secondary syngas by making the produced syngas undergo a catalyst dry-reforming reaction within the catalyst reforming zone 420, The system may further include a wet carbon-refining device 330 which is arranged at a gas exhaust end of the plasma-catalyst reformer 400, filters and refines carbon contained in the primary syngas, and injects the refined syngas to the catalyst reforming zone 420.

The catalyst reforming zone 420 may be in close contact with a wall of the plasma reforming zone 410 and heat a catalyst provided therein with heat transferred from the carbon dioxide plasma P produced in the plasma reforming zone 410.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Figure 1:
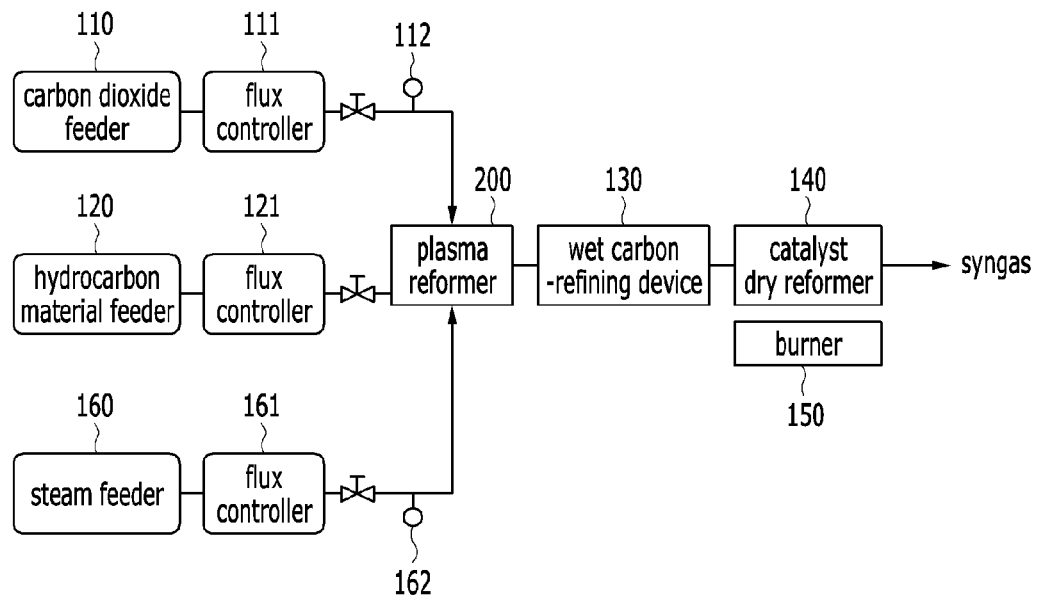
FIG. 1 is a schematic view showing a hybrid reforming system according to a first embodiment of the present invention.

Hereinafter, exemplary embodiments according to the present invention will be described with reference to accompanying drawings. Also, terms and words used in the following description and claims have to be interpreted by not the limited meaning of the typical or dictionary definition, but the meaning and concept corresponding to the technical idea of the present invention on the assumption that the inventor can properly define the concept of the terms in order to describe his/her own invention in the best way.

Further, embodiments described in this specification and elements shown in the drawings are nothing but preferable examples, and do not represent the entirety of the present technical idea. Accordingly, it will be appreciated that they may be replaced by various equivalents and modifications on the filing date of the present invention.

A hybrid reforming system using carbon dioxide plasma and a catalyst according to embodiments of the present invention is a syngas producing system which can maximize a reforming efficiency since a supplied hydrocarbon material primarily undergoes a dry reforming-reaction with carbon dioxide plasma and secondarily undergoes a dry reforming-reaction with a catalyst, and prevent carbon deposition since primary syngas passes through a wet carbon-refining device. Hereinafter, these embodiments will be described distinguishing reforming methods.

First, a hybrid reforming system according to the first embodiment of the present invention is a stepwise system for producing syngas, in which a plasma reformer 200 for primary dry-reforming and a catalyst dry-reformer 140 for secondary dry-reforming are arranged in the form of separate modules. As shown in FIG. 1, the hybrid reforming system includes a carbon dioxide feeder 110 supplying carbon dioxide, a hydrocarbon material feeder 120 supplying a hydrocarbon material, a plasma reformer 200 receiving carbon dioxide and the hydrocarbon material from the carbon dioxide feeder 110 and the hydrocarbon material feeder 120 and producing primary syngas through a reforming reaction while internally producing carbon dioxide plasma by electromagnetic waves, a wet carbon-refining device 130 arranged in an gas exhaust end of the plasma reformer 200 and filtering and refining carbon contained in the primary syngas, and a catalyst dry-reformer 140 arranged in an gas exhaust end of the wet carbon-refining device 130 and producing secondary syngas through a catalyst dry-reforming reaction of the refined syngas.

Flux controllers 111, 121 may be respectively provided in a carbon dioxide feeding-line between the carbon dioxide feeder 110 and the plasma reformer 200 and a hydrocarbon material feeding-line between the hydrocarbon material feeder 120 and the plasma reformer 200 in order to precisely control flux of carbon dioxide or the hydrocarbon material to be fed into the plasma reformer 200.

Further, the flux controllers 111, 121 may be achieved by electronic automatic valves which are automatically opened and closed in response to a preset value or control signal and control the flux. Alternatively, the flux controllers may be achieved by manual valves, opened degrees of which are controlled by a manager's manipulation.

In addition, as shown therein, a pressure gauge 112 for indicating a feeding pressure of carbon dioxide from the carbon dioxide feeder 110 is provided on the carbon dioxide feeding-line between the flux controller 111 and the plasma reformer 200, thereby preventing carbon dioxide from overpressure.

The wet carbon-refining device may employ a carbon refining filter, an electric precipitator or the like typical refinement device for filtering carbon from the gas by a wet process. In addition, the wet carbon-refining device may control water or steam fed into the catalyst dry-reformer, thereby having a function of making the catalyst be more activated and a function of controlling production of carbon monoxide and hydrogen as well as such a wet carbon-refining function.

Carbon dioxide and the hydrocarbon material respectively fed from the carbon dioxide feeder 310 and the hydrocarbon material feeder 320 are injected into the plasma reformer 200 while their flux is controlled by the flux controllers 111 and 121 in accordance with a setting value, and undergo a reforming reaction with carbon dioxide plasma P produced in the plasma reformer 200, thereby producing primary syngas of hydrogen, carbon monoxide, etc. The syngas may be produced of substances other than hydrogen or carbon monoxide in accordance with the injected hydrocarbon materials.

The primary gas produced in the plasma reformer 200 passes through the following wet carbon-refining device 130 so that carbon inevitably produced in the dry reforming-reaction by the carbon dioxide plasma P can be filtered, and is then introduced into the catalyst dry-reformer 140. Through such a refining function, it is effectively prevent carbon from being adsorbed to the catalyst.

The catalyst dry-reformer 140 makes the syngas refined by the wet carbon-refining device 130 undergo a dry-reforming reaction with the catalyst provided therein, thereby producing the secondary syngas.

At a side of the catalyst dry-reformer 140, a burner 150 may be provided as a heat source required for the reforming reaction using the catalyst. The burner 150 may employ a typical heater using electricity or fossil fuel. In order to heat the catalyst dry-reformer, the burner 150 may alternatively use waste heat and waste steam generated in an industrial process besides the heater.

Figure 2:
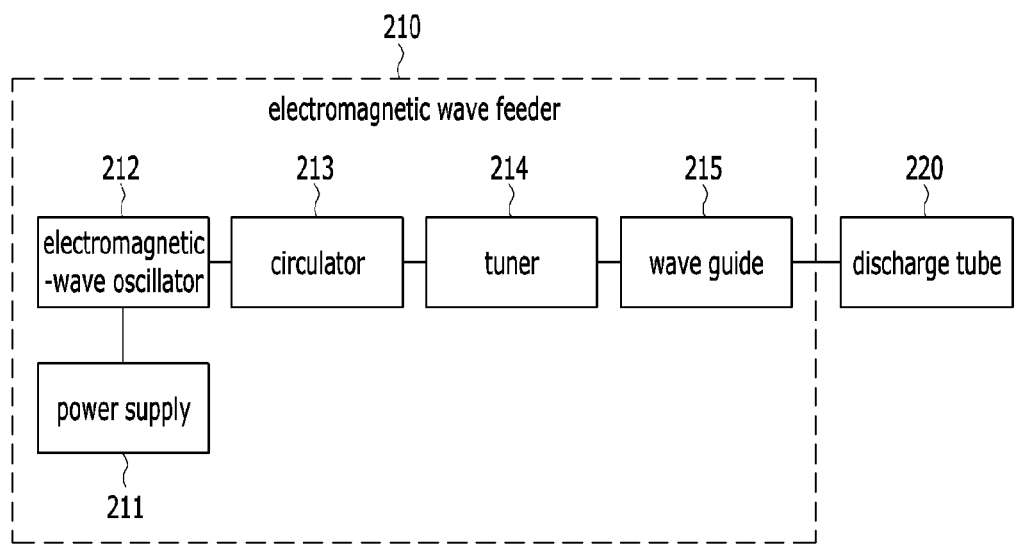
FIG. 2 is a schematic view showing an electromagnetic wave feeder according to the first embodiment of the present invention.
Figure 3:
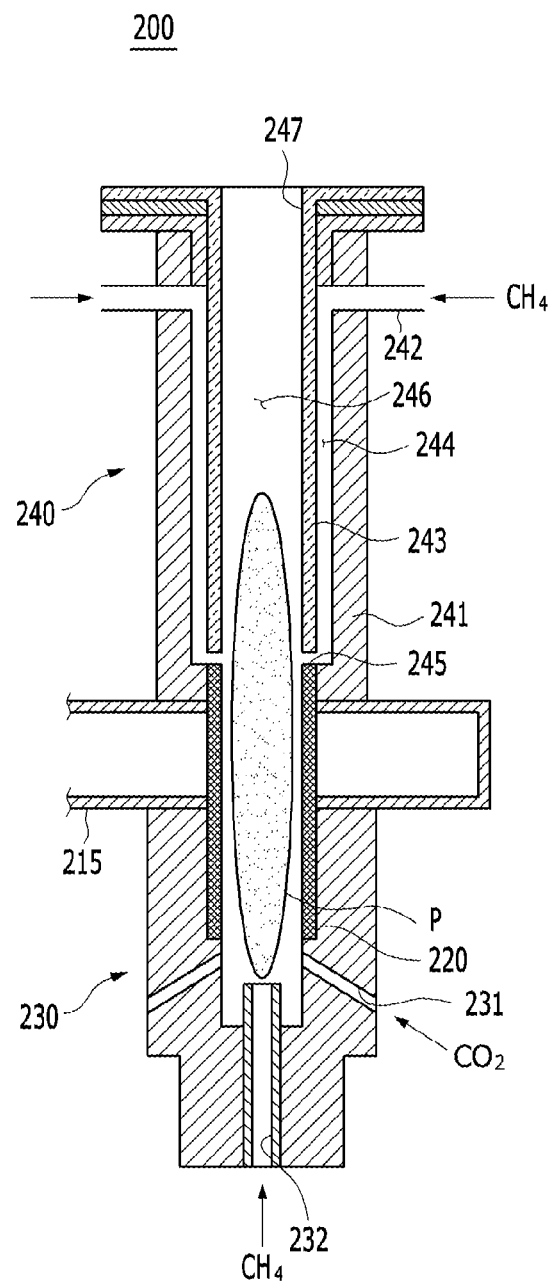
FIG. 3 is a lateral cross-section view showing a plasma reformer according to the first embodiment of the present invention.

By the way, the plasma reformer 200 according to the first embodiment of the present invention is a reforming device in which the hydrocarbon material to undergo the reforming reaction is preheated and then injected to the carbon dioxide plasma P to thereby improve a reforming efficiency. As shown in FIGS. 2 and 3, the plasma reformer 200 includes an electromagnetic wave feeder 210, a discharge tube 220, a supporter 230 and a nozzle 240.

The electromagnetic wave feeder 210 is to generate electromagnetic waves required for producing the carbon dioxide plasma P in the plasma reformer 200. The electromagnetic wave feeder 210 includes a power supply 211, an electromagnetic-wave oscillator 212, a circulator 213, a tuner 214 and a wave guide 215.

The power supply 211 receives driving power from the exterior and supplies power required for driving the electromagnetic wave feeder 210. The electromagnetic-wave oscillator 212 is connected to the power supply 211 and oscillates to generate the electromagnetic waves with power received from the power supply 211.

In this exemplary embodiment, an electromagnetic-wave oscillator (magnetron) of a commercial frequency is used. For example, it is possible to use an electromagnetic-waves oscillator having a frequency of 2.45 GHz, or an electromagnetic-waves oscillator oscillating to generate electromagnetic waves having a frequency range of 902 to 928 MHz (915 MHz magnetron) or 886 to 896 MHz (896 MHz magnetron).

The circulator 213 is connected to the electromagnetic-wave oscillator 212 to output the electromagnetic waves generated in the electromagnetic-wave oscillator 212, and at the same time dissipates energy of the electromagnetic waves reflected by an impedance mismatch to protect the electromagnetic-way oscillator 212.

The tuner 214 is connected to the circulator 213 and induces impedance matching by controlling intensity of incident and reflected waves of the electromagnetic waves output from the circulator 213 so that an electric field induced by the electromagnetic waves can be maximized within the discharge tube 220. The wave guide 215 is connected between the tuner 214 and the discharge tube 220 and serves to make the electromagnetic waves travel from the tuner 214 to the discharge tube 220.

The discharge tube 220 is to produce the carbon dioxide plasma P from the electromagnetic waves, carbon dioxide and the hydrocarbon material. The discharge tube 220 connects with the wave guide 215 at a circumference thereof and receives the electromagnetic waves from the electromagnetic wave feeder 210, the hydrocarbon material as a fuel source from a first hydrocarbon material inlet 232 (to be described later), and carbon dioxide injected together with the hydrocarbon material, thereby producing the carbon dioxide plasma P. Although it is not shown, an igniter for igniting the hydrocarbon material is provided under the discharge tube 220.

The hydrocarbon material to be used as the fuel source may employ a gaseous or liquid hydrocarbon fuel. Such a hydrocarbon fuel may include methane, ethane, propane, butane and the like gaseous fuel, and gasoline, or diesel, kerosene, bunker-C oil, and refined waste oil and the like liquid fuel.

The supporter 230 is a supporting structure which supports the discharge tube 220 to be mounted and at the same time allows carbon dioxide and the hydrocarbon material used as the fuel source to be fed into the discharge tube 220. The supporter 230 is mounted to a circumference of the discharge tube 220, and includes a carbon dioxide inlet 231 which is placed at a circumference thereof and through which carbon dioxide is injected into the discharge tube 220, and the first hydrocarbon material inlet 232 which is placed at a lower portion thereof and through which the hydrocarbon material used as the fuel source required for producing the carbon dioxide plasma P is injected.

As shown in FIG. 3, the first hydrocarbon material inlet 232 is formed as an opening at an upwardly inclined angle toward in a direction where the carbon dioxide plasma P is produced, i.e., in a direction where the syngas is discharged, so that carbon dioxide can be more stably injected. Although it is not shown, a plurality of first hydrocarbon material inlets may be formed at regular intervals along the circumference of the supporter 230 and inclined at a predetermined angle to a wall surface of the supporter 230 so that the hydrocarbon material can be spirally injected along the inside of the supporter 230. Thus, the ignited carbon dioxide plasma P and the hydrocarbon material can be uniformly mixed while the inner walls of the supporter 230 and the discharge tube 220 are protected from flame of the carbon dioxide plasma P having a high temperature.

The nozzle 240 is to feed the hydrocarbon material to undergo the reforming reaction with the carbon dioxide plasma P produced by the discharge tube 220 and discharge the produced syngas to an outlet 247. As shown in FIG. 3, the nozzle 240 includes an outer tube 241, an inner tube 243 and a preheating tube 244.

The outer tube 241 has a tubular shape opened upward and downward, is placed above the supporter 230, and includes a second hydrocarbon material inlet 242 which is provided at an upper circumference thereof and through which the hydrocarbon material to undergo the reforming reaction with the carbon dioxide plasma P is injected.

Like the foregoing hydrocarbon material injected through the first hydrocarbon material inlet 232, the hydrocarbon material injected through the second hydrocarbon material inlet 242 may include methane, ethane, propane, butane and the like gaseous fuel, and gasoline, or diesel, kerosene, bunker-C oil, and refined waste oil and the like liquid fuel.

The inner tube 243 has a tubular shape opened upward and downward like the outer tube 241, is uprightly arranged inside the outer tube 241 to communicate with the discharge tube 220, and is made of a thermally conductive material to be heated by the carbon dioxide plasma P so that the hydrocarbon material passing through the preheating tube 244 can be preheated at a predetermined temperature.

The preheating tube 244 is formed between the outer tube 241 and the inner tube 243 due to difference between an inner diameter of the outer tube 241 and an outer diameter of the inner tube 243. The preheating tube 244 has an upper end communicating with the second hydrocarbon material inlet 242 and a lower end formed with an inlet 245 communicating with the inner tube 243.

Therefore, the hydrocarbon material injected from the second hydrocarbon material inlet 242 placed at an upper end of the outer tube 241 into the inside of the preheating tube 244 flows inside the preheating tube 244 while flowing backward in a direction opposite to a producing direction of the carbon dioxide plasma P, i.e. a discharging direction of the syngas. In this process, the hydrocarbon material is heated to have a predetermined temperature by contact with the inner tube 243 heated by the carbon dioxide plasma P having a high temperature.

Further, the heated hydrocarbon material is discharged toward the carbon dioxide plasma P through the inlet 245 arranged at the lower end of the preheating tube 244

In the nozzle 240 arranged above the discharge tube 220 where the carbon dioxide plasma P is produced, the outer tube 241 and the inner tube 243 are shaped like a tube opened upward and downward and arranged coaxially, and the preheating tube 244 for preheating the injected hydrocarbon material to have a predetermined temperature with heat of the carbon dioxide plasma P is provided between the outer tube 241 and the inner tube 243. Thus, it is possible to mix the hydrocarbon material and the carbon dioxide plasma P while securing heat required for the reforming reaction so that the carbon dioxide plasma P can be stable, thereby maximizing the efficiency of the reforming reaction.

Although it is not shown, the second hydrocarbon material inlet 242 for feeding the hydrocarbon material into the preheating tube 244 is inclined at a predetermined angle to the wall surface of the nozzle 240 and allows the hydrocarbon material to be injected spirally along the inside of the preheating tube 244, and the inlet 245 is also inclined at the same direction as the second hydrocarbon material inlet 242 and allows the injected hydrocarbon material to be injected spirally along the inside of the inner tube 243, so that the carbon dioxide plasma P and the hydrocarbon material can be uniformly mixed, and highly-active radicals can be produced to thereby improve an efficiency of the reforming reaction and a chemical reaction rate.

By the way, the hybrid reforming system according to the first embodiment of the present invention may further include a steam feeder 160 as shown in FIG. 1 to generate steam and feed it to the plasma reformer 200.

In addition, a flux controller 160 is arranged on a steam feeding-line between the steam feeder• 160 and the plasma reformer 200• and precisely controls the flux of the steam to be fed into the plasma reformer 200, and a pressure gauge 162 indicating a feeding pressure of steam from the steam feeder 160 is provided on the steam feeding-line, thereby preventing the steam from overpressure.

With a structure of using the steam feeder 160 to feed the steam to the plasma reformer 200, carbon produced in the reforming reaction can be oxidized and removed, and it is possible to control a ratio (Ρατιο) of amount (Μολε) between carbon monoxide and hydrogen produced in the reforming reaction.

Further, the plasma reformer 200 uses steam fed from the steam feeder 160 to generate steam plasma and make the hydrocarbon material undergo the reforming reaction, thereby not only decreasing carbon deposition but also reducing system costs since a catalyst made of precious metal or a separate reducing process is not necessary as compared with a conventional wet reforming-reaction method using a catalyst.

Next, a structure and function of a hybrid reforming system according to a second embodiment of the present invention will be described.

Figure 4:
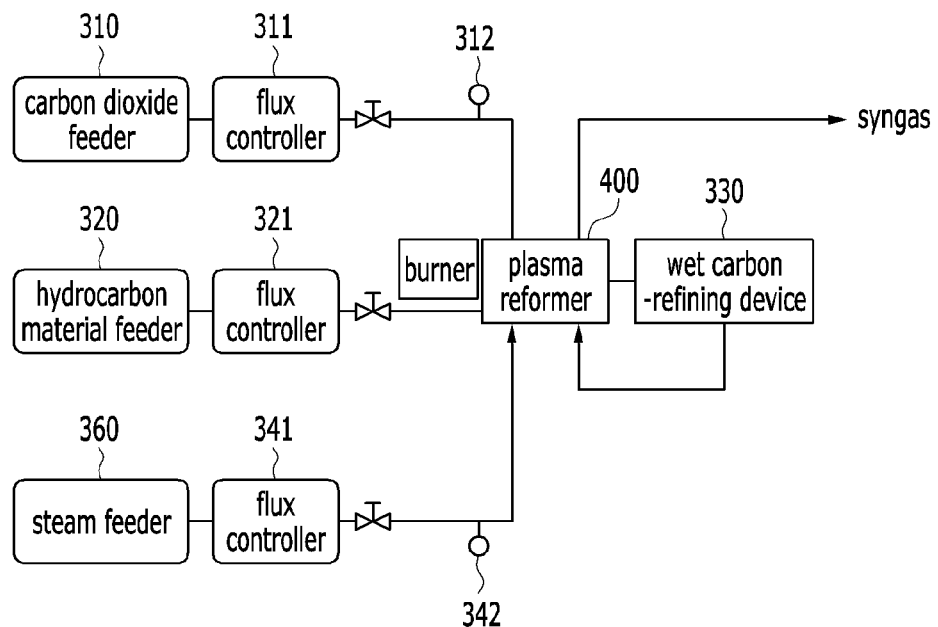
FIG. 4 is a schematic view showing a hybrid reforming system according to a second embodiment of the present invention.

The hybrid reforming system according to the second embodiment of the present invention is a system where a primary dry-reforming reaction using carbon dioxide plasma P and a secondary dry-reforming reaction using a catalyst are achieved in the form of a single module, thereby synthetically producing syngas. Referring to FIG. 4, the hybrid reforming system according to the second embodiment of the present invention includes a carbon dioxide feeder 310 for feeding carbon dioxide, a hydrocarbon material feeder 320 for feeding a hydrocarbon material, and a plasma-catalyst reformer 400 where a double dry reforming-reaction occurs to improve a reforming efficiency.

Flux controllers 311, 321 may be respectively provided in a carbon dioxide feeding-line between the carbon dioxide feeder 310 and the plasma reformer 400 and a hydrocarbon material feeding-line between the hydrocarbon material feeder 320 and the plasma reformer 400 in order to precisely control flux of carbon dioxide or the hydrocarbon material to be fed into the plasma-catalyst reformer 400.

In addition, as shown therein, a pressure gauge 312 for indicating a feeding pressure of carbon dioxide from the carbon dioxide feeder 310 is provided on the carbon dioxide feeding-line between the flux controller 311 and the plasma-catalyst reformer 400, thereby preventing carbon dioxide from overpressure.

Further, a wet carbon-refining device 330 may be provided at a gas exhaust end of the plasma-catalyst reformer 400 to filter and refine carbon contained in primary syngas and inject the refined syngas into a catalyst reforming zone 420.

The wet carbon-refining device 330 may control water or steam fed into the catalyst dry-reformer 140, thereby having both a function of making the catalyst be more activated and a function of controlling production of carbon monoxide and hydrogen as well as a wet carbon-refining function.

Figure 5:
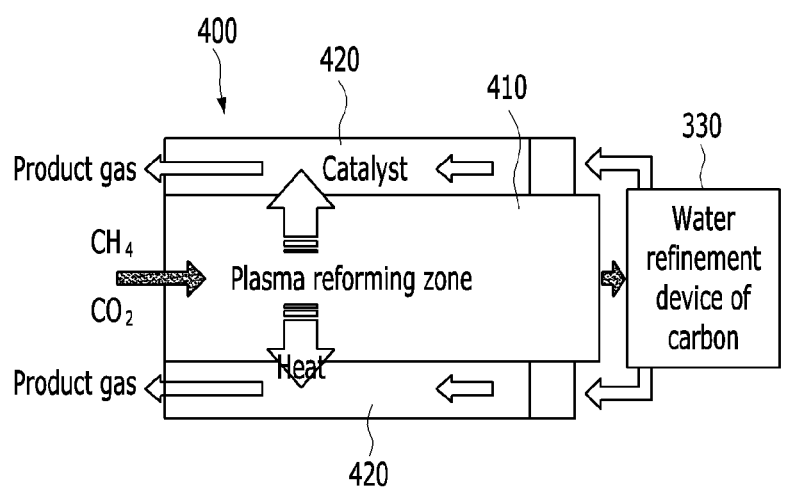
FIG. 5 is a schematic view showing a plasma-catalyst reformer according to the second embodiment of the present invention.

Referring to FIG. 5, the plasma reforming zone 410 provides a space where the carbon dioxide plasma P is produced from injected methane or the like hydrocarbon material and carbon dioxide by electromagnetic waves generated by an electromagnetic wave feeder, and the primary syngas such as hydrogen or carbon monoxide produced by the reforming reaction with the carbon dioxide plasma P is discharged to the wet carbon-refining device 330 arranged in the gas exhaust end.

Further, the catalyst reforming zone 420 is internally provided with a catalyst, receives the primary syngas refined by the wet carbon-refining device 130, and allows non-reformed substances contained in the primary syngas to undergo the dry reforming-reaction with the catalyst, thereby producing secondary syngas with high reforming efficiency and discharging it to the exhaust end.

As shown in FIG. 5, the catalyst reforming zone 420 is in close contact with a wall of the plasma reforming zone 410 and receives heat from the carbon dioxide plasma P produced in the plasma reforming zone 410, thereby heating the catalyst provided therein.

To improve a heating effect, the wall of the plasma reforming zone 410 is made of a thermally conductive material so that more heat can be transferred to the catalyst reforming zone 420.

Thus, the catalyst reforming zone 420 heats the catalyst with heat received from the plasma reforming zone 410, and thus makes the primary syngas secondarily undergo the dry reforming-reaction in the state that heat required for the reforming reaction is secured, thereby stabilizing the reforming reaction and maximizing the efficiency of the reforming reaction.

As shown in FIG. 4, the hybrid reforming system according to the second embodiment of the present invention may include a burner 350 provided at one side of the plasma-catalyst reformer 400 as a heat source required for the reforming reaction using the catalyst. The burner 350 may employ a typical heater using electricity or fossil fuel. In order to heat the plasma-catalyst reformer 400, the burner 350 may alternatively use waste heat and waste steam generated in an industrial process besides the heater.

By the way, the hybrid reforming system according to the second embodiment of the present invention may further include a steam feeder 340 to generate steam and feed it to the plasma-catalyst reformer 400.

In addition, a flux controller 341 is arranged on a steam feeding-line between the steam feeder• 340 and the plasma-catalyst reformer 400• and precisely controls the flux of the steam to be fed into the plasma-catalyst reformer 400, and a pressure gauge 162 indicating a feeding pressure of steam from the steam feeder 340 is provided on the steam feeding-line, thereby preventing the steam from overpressure.

With a structure of using the steam feeder 340 to feed the steam to the plasma-catalyst reformer 400, carbon produced in the reforming reaction can be oxidized and removed, and it is possible to control a ratio (Ρατιο) of amount (Μολε) between carbon monoxide and hydrogen produced in the reforming reaction.

Further, the plasma-catalyst reformer 400 uses steam fed from the steam feeder 340 to generate steam plasma and make the hydrocarbon material undergo the reforming reaction, thereby not only decreasing carbon deposition but also reducing system costs since a catalyst made of precious metal or a separate reducing process is not necessary as compared with a conventional wet reforming-reaction method using a catalyst.

As described above, the hybrid reforming system using the carbon dioxide plasma and the catalyst according to the embodiments of the present invention makes the fed hydrocarbon material primarily undergo the dry reforming-reaction with the carbon dioxide plasma, and secondarily undergo the dry reforming-reaction with the catalyst to thereby maximize the reforming efficiency, and allows the primary syngas to pass through the wet carbon-refining device 130, 330 to thereby filter and refine carbon produced by the reforming reaction with the carbon dioxide plasma and thus prevent the catalyst from having poor performance due to carbon adsorbed to the catalyst.

Further, in the plasma reformer 200 for the plasma dry reforming-reaction, the nozzle 240 arranged above the discharge tube 220 where the carbon dioxide plasma P is produced includes the outer tube 241 and the inner tube 243, which are shaped like a tube opened upward and downward and coaxially arranged, and the preheating tube 244, which is provided between the outer tube 241 and the inner tube 243 and preheats the injected hydrocarbon material to have a predetermined temperature with heat from the carbon dioxide plasma P, so that the hydrocarbon material can be mixed with the carbon dioxide plasma P in the state that heat required for the reforming reaction is secured, thereby securing the stability of the carbon dioxide plasma P and thus and maximizing the efficiency of the reforming reaction.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A hybrid reforming system for producing syngas through a reforming reaction between carbon dioxide plasma and a hydrocarbon material, the system comprising:
   a carbon dioxide feeder (110) which feeds carbon dioxide;
   a hydrocarbon material feeder (120) which feeds the hydrocarbon material;
   a plasma reformer (200) which respectively receives the carbon dioxide and the hydrocarbon material from the carbon dioxide feeder (110) and the hydrocarbon material feeder (120), generates electromagnetic waves, produces carbon dioxide plasma (P) using the electromagnetic waves and the carbon dioxide from the carbon dioxide feeder, performs a dry reforming reaction to the hydrocarbon material from the hydrocarbon material feeder (120) with the carbon dioxide plasma (P), initiating to produce primary syngas from the hydrocarbon material fed from the hydrocarbon material feeder (120), the primary syngas including carbon monoxide and hydrogen;
   a wet carbon-refining device (130) which is arranged at a gas exhaust end of the plasma reformer (200) and filters and refines carbon contained in the primary syngas providing a refined primary syngas; and
   a catalyst dry-reformer (140) which is arranged at a gas exhaust end of the wet carbon-refining device (130), receives the refined primary syngas from the wet carbon-refining device (13), performs a catalyst dry reforming reaction to the refined primary syngas, and produces secondary syngas including carbon monoxide and hydrogen.

2. The hybrid reforming system according to claim 1, wherein the plasma reformer (200) comprises:
   an electromagnetic wave feeder (210) which generates the electromagnetic waves having a preset frequency;
   a discharge tube (220) which produces the carbon dioxide plasma (P);
   a supporter (230) which is mounted to a circumference of the discharge tube (220) and comprises a carbon dioxide inlet (231) for injecting carbon dioxide into the discharge tube (220) and a first hydrocarbon material inlet (232) for injecting the hydrocarbon material;
   a nozzle (240) which comprises an outer tube (241) having a tubular shape opened upward and downward, placed above the supporter (230), provided with a second hydrocarbon material inlet (242) at an upper circumference thereof to inject the hydrocarbon material to undergo a reforming reaction with the carbon dioxide plasma (P), an inner tube (243) having a tubular shape opened upward and downward, and uprightly arranged inside the outer tube (241) to communicate with the discharge tube (220), and a preheating tube (244) formed in between the outer tube (241) and the inner tube (243) due to difference between an inner diameter of the outer tube (241) and an outer diameter of the inner tube (243), and having an upper end communicating with the second hydrocarbon material inlet (242) and a lower end formed with an inlet (245) communicating with an inside of the inner tube (243) wherein the hydrocarbon material injected by the second hydrocarbon material inlet (242) passes through the preheating tube (244) and is inputted into the inside of the inner tube (243) via the inlet (245).

3. The hybrid reforming system according to claim 2, wherein the inner tube (243) is made of a thermally conductive material and heated by the carbon dioxide plasma (P) so that the hydrocarbon material passing through the preheating tube (244) can be preheated to have a predetermined temperature.

4. A hybrid reforming system for producing syngas through a reforming reaction between carbon dioxide plasma (P) and a hydrocarbon material, the system comprising:

a carbon dioxide feeder (310) which feeds carbon dioxide;

a hydrocarbon material feeder (320) which feeds the hydrocarbon material; and a plasma-catalyst reformer (400) which has an integrated structure where a plasma reforming zone (410) and a catalyst reforming zone (420) are provided, the system further comprising a wet carbon-refining device (330) which is arranged at a gas exhaust end of the plasma-catalyst reformer (400)

wherein:

the plasma reforming zone (410) receives the carbon dioxide and the hydrocarbon material from carbon dioxide feeder (310) and the hydrocarbon material feeder (320), generates electromagnetic waves, produces carbon dioxide plasma (P) using the electromagnetic waves and the carbon dioxide from the carbon dioxide feeder (310), performs a dry reforming reaction to the hydrocarbon material from the hydrocarbon material feeder (320) with the carbon dioxide plasma (P), initiating to produce primary syngas from the hydrocarbon material fed from the hydrocarbon material feeder (320), the primary syngas including carbon monoxide and hydrogen;

the wet carbon-refining device (330) receives the primary syngas which is outputted out of the plasma-catalyst reformer (400), and filters and refines carbon contained in the primary syngas, and provides and injects a refined primary syngas to the catalyst reforming zone (420) of the plasma-catalyst reformer (400); and the catalyst reforming zone (420) receives the refined primary syngas from the wet carbon-refining device (330), performs a catalyst dry reforming reaction to the refined primary syngas to produce secondary syngas including carbon monoxide and hydrogen.

5. The hybrid reforming system according to claim 4, wherein the catalyst reforming zone (420) is in close contact with a wall of the plasma reforming zone (410) and heats a catalyst provided in the catalyst reforming zone (420) with heat transferred from the carbon dioxide plasma (P) produced in the plasma reforming zone (410).

6. The hybrid reforming system according to claim 2, wherein the first hydrocarbon material inlet (232) is disposed below a bottom of the discharge tube (220), and the second hydrocarbon material inlet (242) is disposed above a top of the discharge tube (220).

* * * * *